United States Patent Office 3,652,706
Patented Mar. 28, 1972

3,652,706
POLYMERIZATION OF OLEFINS
George S. Saines, Fishkill, and Stanley Kravitz, Wiccopee, N.Y., assignors to Texaco Inc., New York, N.Y.
No Drawing. Filed Sept. 16, 1969, Ser. No. 858,519
Int. Cl. C07c 3/18
U.S. Cl. 260—683.15 B
10 Claims

ABSTRACT OF THE DISCLOSURE

An olefin hydrocarbon polymerization process which produces a polymer having a molecular weight within the range of from about 700 to about 2500, by polymerizing such olefins in the presence of a catalyst system comprising a Friedel-Crafts metal halide in admixture with the hydrogen form of mordenite preferably in the presence of aluminum bromide in admixture with the hydrogen form of synthetic mordenite.

---

This invention relates to the catalytic polymerization of olefin hydrocarbons and more particularly to the polymerization of olefinic hydrocarbons utilizing as a catalyst system a Friedel-Crafts type metal halide and the hydrogen form of mordenite.

The conversion of olefin hydrocarbons into higher molecular weight polymers is well known. Polymerization may be accomplished by either catalytic or non-catalytic means but due to the relatively more severe operating conditions necessary for non-catalytic method the majority of olefin polymerization is carried out by catalytic means. The catalysts which have been proposed for the catalytic polymerization of olefins range from absorbents such as activated clay through mineral acids such as phosphoric and sulphuric acids to Friedel-Crafts type catalysts exemplified by the halides of aluminum, and boron. The Friedel-Crafts type catalyst are more active and are more commonly used for polymerization of olefins to higher molecular weight products.

It is an object of the present invention to provide a process for the polymerization of olefin hydrocarbons. It is still a further object of the present invention to provide a new and improved modified Friedel-Crafts type heterogeneous catalyst system for the polymerization of olefin hydrocarbons to polymers having a molecular weight of from about 700 to about 2500. Additional objects will become apparent from the following description of the invention herein disclosed.

It has now been found that an olefin hydrocarbon can be polymerized to a polymer having a molecular weight within the range of from about 700 to about 2500 by a process which comprises contacting an olefin hydrocarbon and mixtures thereof under polymerization conditions of temperature and pressure with a catalytic amount of a Friedel-Crafts metal halide and the hydrogen form of mordenite, and recovering a polymer of said olefin hydrocarbon. More particularly it has been found that the use of a catalyst system comprising the hydrogen form of mordenite preferably synthetic mordenite and a Friedel-Crafts metal halide, (hereinafter referred to as catalyst system) particularly aluminum chloride, aluminum bromide, and boron trifluoride, produces a polymer of said hydrocarbon olefin, hereinafter referred to as olefin polymer, which has a molecular weight within the range of from about 700 to about 2500, preferably from about 900 to about 1500, in significant yields. In addition the catalyst system has been found to be particularly effective during extended periods of use where the catalyst is used continuously for the polymerization of an olefin hydrocarbon.

In accordance with this method, the olefin feed, gaseous or liquid, contacts the catalyst comprising the Friedel-Crafts metal halide hereinafter referred to as metal halide and the hydrogen form of mordenite, hereinafter referred to as hydrogen mordenite in a conventional polymerization reactor under polymerization conditions of temperature, pressure, catalyst concentration and olefin concentration sufficient to produce a polymer product. The effluent is then recovered from the catalyst system by conventional means such as by quenching the catalyst in a medium such as aqueous caustic or a water alcohol mixture, followed by polymer recovery by dilution with hexane, filtration washing with water and vacuum stripping. Alternatively, for example the catalyst and olefin can be continuously added to a conventional polymerization reactor or the catalyst can be added to an olefin feed under a liquefying pressure. It is contemplated within the scope of this invention that the polymerization of the olefin hydrocarbon can be carried out either by a batch, semicontinuous or a continuous method using conventional polymerization reactors heretofore utilized in the prior art.

The catalyst for the polymerization of the olefin hydrocarbon is a Friedel-Crafts metal halide catalyst promoted with hydrogen mordenite. The metal halide-hydrogen mordenite catalyst can be prepared for use as a catalyst system by blending the metal halide and hydrogen mordenite, preferably in an inert atmosphere, with for example a liquid medium substantially inert to the catalyst, reactants and polymerization products such as saturated aliphatic hydrocarbons having from 3 to 8 carbon atoms or saturated cycloaliphatic hydrocarbons having from 4 to 8 carbon atoms, examples of which are butane, propane, pentane, hexane, heptane and cyclohexane. It is preferred to have the medium free of water, sulphur and unsaturated compounds. Of course, it is contemplated within the scope of this invention that the catalyst including both metal halide and hydrogen mordenite can be added separately with or without a liquid medium to the olefin hydrocarbon to be polymerized. It is preferred, however, in carrying out the process of this invention, especially where the olefin is gaseous at ambient temperature, to pass the olefin hydrocarbon through a catalyst suspension comprising metal halide, hydrogen mordenite and liquid medium. In general when a liquid medium is used, catalyst solutions comprise from about 0.2 to about 1.0 wt. percent of metal halide and from about 1 to about 5% hydrogen mordenite in the liquid medium. The catalyst with or without a liquid medium can be prepared by mixing the metal halide and hydrogen mordenite together at a temperature in general from about 10° C. to about 30° C. for a time generally from about 5 to about 30 minutes, although temperatures and times above and below those set forth above can in addition be utilized. In general the weight ratio of metal halide to hydrogen mordenite can vary over a wide range and in general is from 0.1:1 to about 0.5:1, more preferably from about 0.2:1 to about 0.4:1.

The time of contacting the catalyst system and olefin hydrocarbon can vary over a wide range and in general times of from about 30 minutes to about 4 hours, preferably from about 2 hours to about 4 hours are utilized. The conditions of temperature, pressure and concentration of catalyst can vary over a wide range and in general a reaction temperature is utilized which is sufficient to effect polymerization, and in general is from about −20 to about 10° C., more preferably from about 0 to about 5° C. at pressures of from about 14.7 p.s.i.g. to about 1,000 p.s.i.g., more preferably from about 14.7 p.s.i.g. to about 200 p.s.i.g. The amount of catalyst employed in general is from about 0.25 to about 25 wt. percent more preferably from about 0.5 to about 15 wt. percent based upon the olefins present in the reaction zone. By the use of the term concentration of catalyst present in the polymerization zone is meant the total catalyst including both metal halide and hydrogen mordenite, but not including any liquid medium utilized in the polymerization zone. After completion of the polymerization the polymer can be isolated from the polymerization mixture by conventional methods such as filtration, solvent extraction, distillation, absorption, crystallization, and the like.

The olefin hydrocarbons can be terminal, internal, branched or unbranched, and in general contain from 2 to about 20 carbon atoms, more preferably from 3 to about 6 aliphatic carbon atoms per molecule. In addition, mixtures of various olefins can be utilized. Typical examples of suitable olefins include ethylene, propylene, isobutylene, butene-1, pentene-1, pentene-2, 3-methylbutene-1, 4-methylpentene-2, octene-1, dodecene-1, tetradecene-1, styrene and α-methylstyrene. The feed stock may be one containing relatively small amounts of the above-described polymerizable olefin hydrocarbons or may be made up entirely of such materials. It is preferred to have an olefin feed stock containing no less than 5 wt. percent of the polymerizable olefin hydrocarbon and in general can contain impurities such as the paraffins, isoparaffins, and generally the same impurities as may be tolerated by the Friedel-Crafts catalyst known to the prior art. As an example, purified refinery feed streams can be employed in the process of this invention, such as those feed streams containing for example 30 to 90 parts by weight propylene, 30 to 50 parts by weight propane, 0 to 15 parts by weight isobutane and butane, with less than 4 parts by weight other olefin hydrocarbons such as ethylene and isobutylene.

The catalyst system is an improved modification of a Friedel-Crafts type catalyst. As stated above the initial component to the catalyst system may be any of the Friedel-Crafts type metal halides exemplified by $AlCl_3$ $AlBr_3$, $GaCl_3$, $TiCl_3$, $ZnCl_2$, $FeCl_3$, $BF_3$, and the like, the preferred initial component being $AlBr_3$. The hydrogen form of mordenite structures are characterized by parallel absorption channels of uniform cross-section and in general a sodium content less than 5 wt. percent. The absorption channels are parallel to the c-axis of the crystal and are elliptical in cross-section. The absorption channels' dimensions of the sodium mordenite based on crystallographic studies have been reported as having a minor diameter of 5.8–5.9 A. and a major diameter of 7.0–7.1 A. and a free diameter of 6.6 A. whereas the hydrogen form of mordenite is believed to have somewhat larger pore openings with a minor diameter of not less than about 5.8 A and a major diameter less than 8 A. The effective working pore diameter of hydrogen mordenite prepared by acid treating for example synthetic sodium mordenite appears to be in the range of 8 A. to 10 A. as indicated by absorption of aromatic hydrocarbons.

Mordenite has a chain type zeolite structure in which a number of chains are linked together into a structural pattern with parallel sorption channels similar to a bundle of parallel tubes. Mordenites in addition are characterized by relatively high silica contents that is silica to alumina weight ratios of from about 6 to 1 to about 20 to 1. The sodium form has in general a silica to alumina mole ratio of 10 and generally contains more than 80 mole percent silica, less than 10 percent alumina and less than 10 percent soda (dehydrated basis).

Synthetic mordenite is usually produced in the sodium form that is as a sodium alumino silicate. The hydrogen form or decationized form can be produced by for example ion exchange of sodium in the mordenite with ammonium ions followed by heating or calcining to drive off ammonia or by acid treatment of sodium mordenite. The acid treatment may also remove some of the alumina from the mordenite zeolite structure and thereby increase the relative portion of silica to alumina in the zeolite. The weight ratio of silica to alumina is about 6 in natural or synthetic sodium mordenite. Acid treatment suitably is effected with dilute hydrochloric acid. In general up to about 90% of the sodium ions in the mordenite can be replaced with hydrogen by acid treatment, e.g. by treatment with dilute aqueous hydrochloric acid. Hydrogen mordenite prepared by treating synthetic sodium mordenite with hydrochloric acid, e.g. warm 3 N to 6 N hydrochloric acid is a preferred catalyst with low sodium content. It is desirable in addition to calcine the mordenite by heating in air to a temperature above 500° F. preferably up to 1,000° F.

The hydrogen mordenite in general may be used in the form of granules, e.g. ⅛ inch and 1/16 inch pellets or powder (such as 5 microns or finer).

The invention can be beter appreciated by the following non-limiting examples:

EXAMPLE 1

To a one liter polymerization reactor equipped with stirrer, cooling means, gas inlet and exit means is charged 2.7 grams of anhydrous aluminum bromide, 11.0 grams of hydrogen mordenite having the following properties:

Weight percent sodium _____ Less than 5%.
Minor diameter _____ 5.8 to 5.9 A.
Major diameter _____ 7:7.1 A.
Free diameter _____ 6.6 A.
Silica to alumina mole ratio _____ 10.

and 620 milliliters of n-heptane under a nitrogen atmosphere. The temperature is reduced to 0° C. and propylene (gaseous) is introduced at a rate of 140 milliliters per minute over a period of 4 hours. To the mixture is added 50 milliliters of a 1:1 (volume basis) solution of water and isopropyl alcohol. The product mixture is then washed with a saturated aqueous solution of sodium bicarbonate until neutral. The n-heptane polymer phase is then dried and the heptane evaporated under reduced pressure. A polypropylene polymer (36 grams, 60% yield) is obtained which has an average molecular weight of 1,000.

EXAMPLE 2

Utilizing the equipment as described in Example 1, gaseous propylene is introduced into the reactor utilizing the same conditions, concentration and catalyst system as in Example 1 except that the aluminum bromide catalyst is omitted. It is determined that no polymer formation occurred.

The results set forth in Examples 1 and 2 demonstrate the outstanding performance of the process of this invention for preparing polymers of olefin hydrocarbons utilizing a Friedel-Crafts metal halide and a hydrogen mordenite catalyst system. More particularly Examples 1 and 2 demonstrate that a polypropylene polymer having a molecular weight within the range of from about 700 to about 2500 is prepared in good yields utilizing such a catalyst system whereas hydrogen mordenite is not an effective catalyst when utilized singly for the polymerization of olefin hydrocarbons. Thus, the process of this invention is capable of using a solid heterogeneous cocatalyst (hydrogen mordenite) which can be readily separated from the olefin polymer prepared utilizing such cocatalyst, Thus, the use of such solid cocatalyst in combination with a metal halide produces a catalyst system which provides for continued preparation of an olefin polymer over extended periods of time thereby extending greatly the effectiveness of the catalyst system.

Obviously, many modifications and variations of the invention as hereinabove set forth, may be made without departing from the spirit and scope thereof, and therefore, only such limitations should be imposed as are indicated in the appended claims.

We claim:

1. The process for polymerizing olefin hydrocarbons which comprises providing an olefin feed stream containing no less than 5 weight percent of a polymerizable olefin hydrocarbon having from about 2 to about 20 carbon atoms; contacting said olefin hydrocarbon under polymerization conditions at between —20 to about 10° C. and under between 14.7 p.s.i.g. to about 1,000 p.s.i.g. with about 0.25 weight percent to about 25 weight percent basis olefin of a Friedel-Crafts metal halide mixed with and promoted by the hydrogen form of mordenite catalyst and recovering a polymer of said olefin hydrocarbon having a molecular weight of from about 700 to about 2,500.

2. The process according to claim 1 wherein said olefin feed stream is gaseous at ambient temperature and is passed through a catalyst suspension comprising said metal halide, hydrogen mordenite and liquid medium said suspension comprising from about 0.2 to about 1.0 wt. percent of said metal halide, and from about 1 to about 5% hydrogen mordenite in said liquid medium.

3. A process of claim 1 wherein the olefin hydrocarbon contains from 3 to about 6 aliphatic carbon atoms and the mordenite catalyst is a synthetic mordenite catalyst.

4. A process of claim 1 wherein the metal halide catalyst is selected from the group consisting of aluminum chloride and aluminum bromide, said catalyst being employed as a solid or suspended in a liquid medium with said mordenite.

5. A process of claim 3 wherein the metal halide catalyst is selected from the group consisting of aluminum chloride and aluminum bromide, said catalyst being employed as a solid or suspended in a liquid medium with said mordenite.

6. A process of claim 1 wherein the hydrogen form of mordenite has a silica to alumina weight ratio of from about 6:1 to about 20:1 and a sodium content of less than 5 weight percent.

7. A process of claim 3 wherein the hydrogen form of mordenite has a silica to alumina weight ratio of from about 6:1 to about 20:1 and a sodium content of less than 5 weight percent.

8. A process of claim 5 wherein the hydrogen form of mordenite has a silica to alumina weight ratio of from about 6:1 to about 20:1 and a sodium content of less than 5 weight percent.

9. A process of claim 5 wherein the hydrogen form of mordenite has a particle size of from about 5 microns to about 1/8 inch.

10. A process of claim 9 wherein the olefin hydrocarbon is selected from the group consisting of propylene and isobutylene.

References Cited

UNITED STATES PATENTS

| | | | |
|---|---|---|---|
| 2,329,714 | 9/1943 | Grasshof | 260—683.15 |
| 3,243,473 | 3/1966 | Engelbrecht et al. | 260—683.15 |
| 3,322,848 | 5/1967 | Garwood et al. | 260—683.15 |
| 3,442,964 | 5/1969 | Oldham | 260—683.15 X |
| 3,463,744 | 8/1969 | Mitsche | 252—442 |
| 3,467,728 | 9/1969 | Hervert | 260—683.2 |
| 3,515,769 | 6/1970 | Fishel | 260—683.15 |

PAUL M. COUGHLAN, Jr., Primary Examiner

U.S. Cl. X.R.

252—442